United States Patent [19]

Crites

[11] Patent Number: 4,901,933
[45] Date of Patent: Feb. 20, 1990

[54] ENDLESS LOOP TRANSPORT AND STORAGE SYSTEM

[76] Inventor: Clark F. Crites, 14371 Mulholland Dr., Los Angeles, Calif. 90077

[21] Appl. No.: 123,742

[22] Filed: Nov. 23, 1987

Related U.S. Application Data

[63] Continuation of Ser. No. 777,150, Sep. 18, 1985, abandoned.

[51] Int. Cl.⁴ .............................................. B65H 20/26
[52] U.S. Cl. .............................. 242/55.19 R; 352/178
[58] Field of Search ...................... 242/55.19 R, 55.18; 352/128

[56] References Cited

U.S. PATENT DOCUMENTS

| | | | |
|---|---|---|---|
| 1,469,483 | 10/1923 | Parkinson | 242/55.19 R |
| 2,398,639 | 4/1946 | Heyer | 242/55.19 R |
| 4,010,910 | 3/1977 | Boudouris et al. | 242/55.18 |
| 4,186,891 | 2/1980 | Johnson | 242/55.19 R |
| 4,208,018 | 6/1980 | Wilkinson | 242/55.19 R |
| 4,504,025 | 3/1985 | Potts | 242/55.19 R |

Primary Examiner—John M. Jillions
Attorney, Agent, or Firm—Poms, Smith, Lande & Rose

[57] ABSTRACT

A transport and storage apparatus and method especially adapted for use in an endless loop film projection system. A turntable rotating at a constant speed synchronized with a film projector has mounted thereon a platter having a cam track including a plurality of arcuate sections alternating with an equal plurality of straight sections, the latter constituting chords relative to the axis of rotation. Means are provided for measuring the linear speed of the cam track and for applying incoming film to the platter at speeds cyclically varying from maximum speed during each arcuate section of the cam track to lower speeds during each chord section of the cam track, the applied film being metered in timed relation with the linear speed of the track. Radially extending low friction skid strips may be provided on the upper surface of the turntable to assist the portions of film layers applied during the chord sections of the cam track to move radially inwardly on the platter to form inwardly directed rounded cusps. Template means may be provided for use during initial stages of loading or make-up of a filmed program on the platter, and anchor blocks of rubbery high friction material may be provided on the platter surface to resist the breaking down of the ends of each of the arcuate portions of film on the platter until enough film layers are applied to give the coil stability.

22 Claims, 5 Drawing Sheets

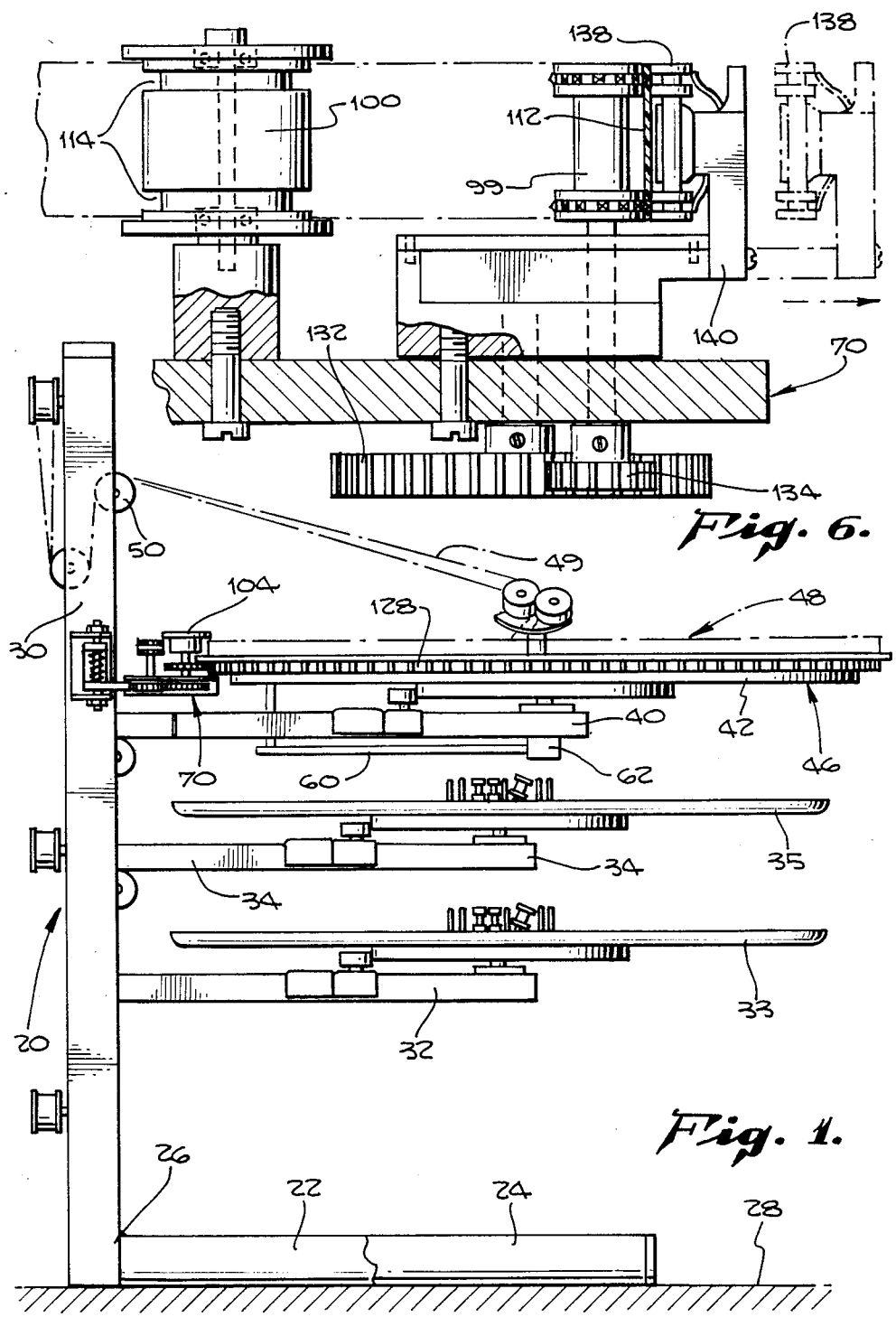

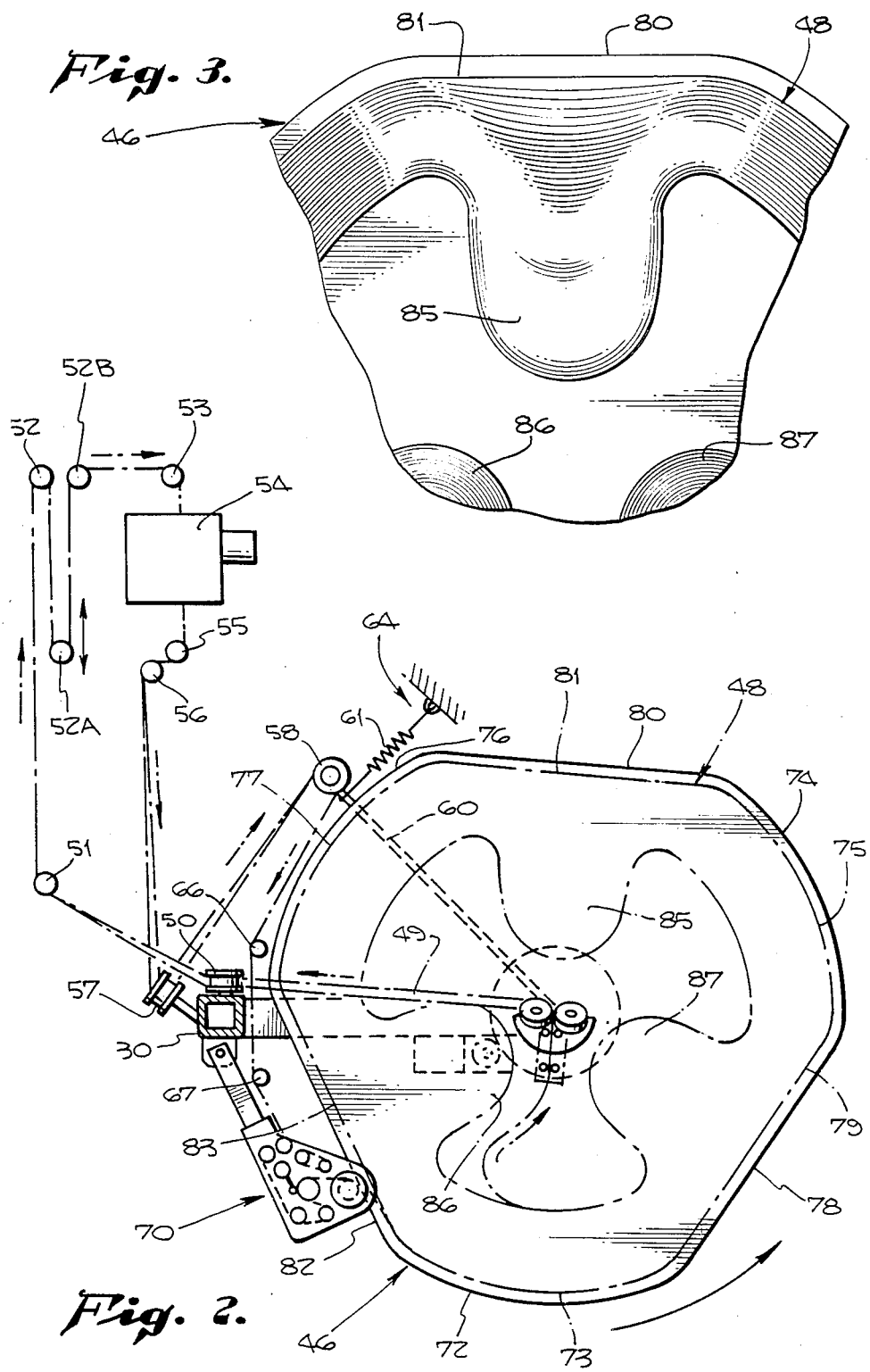

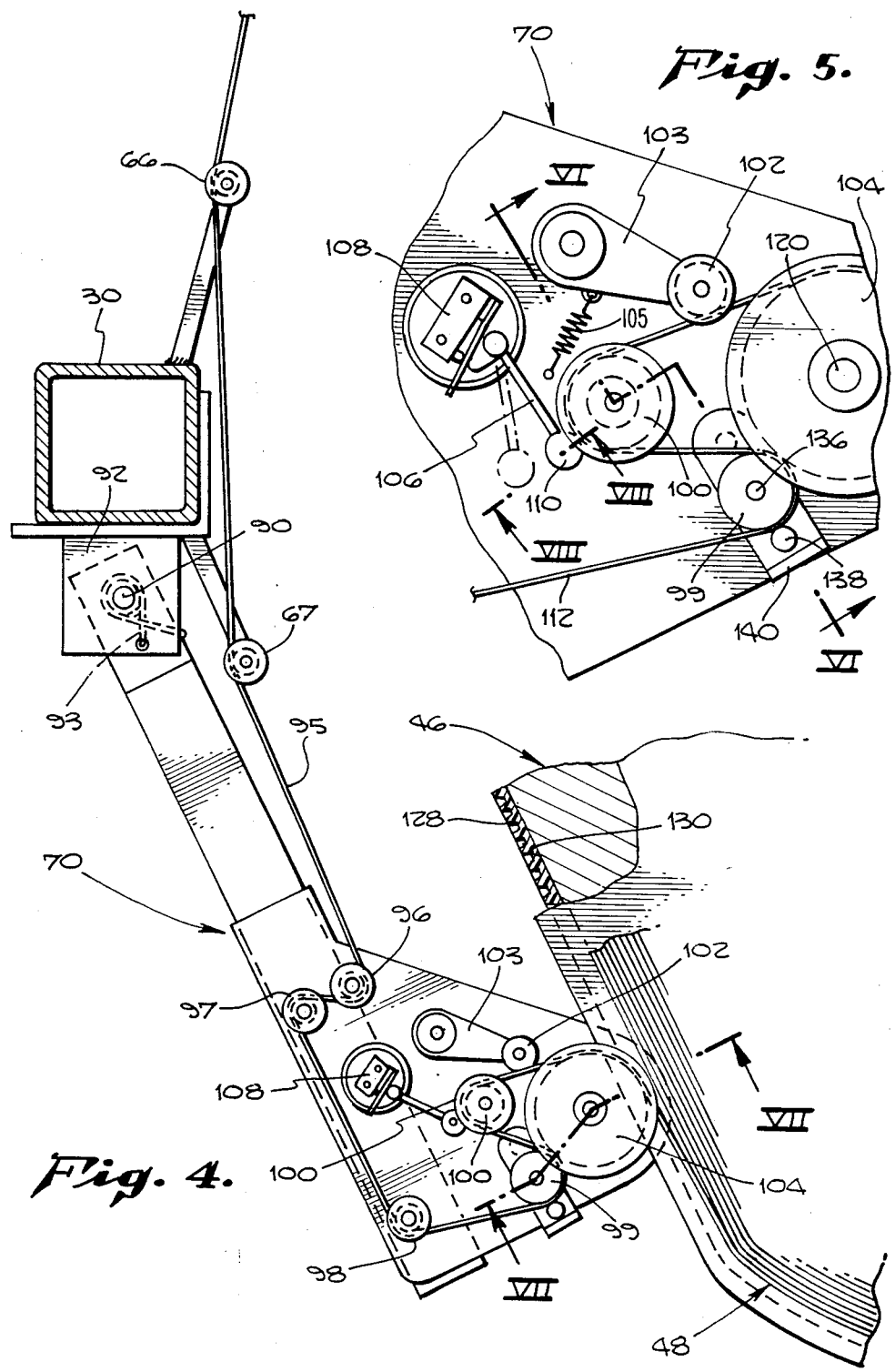

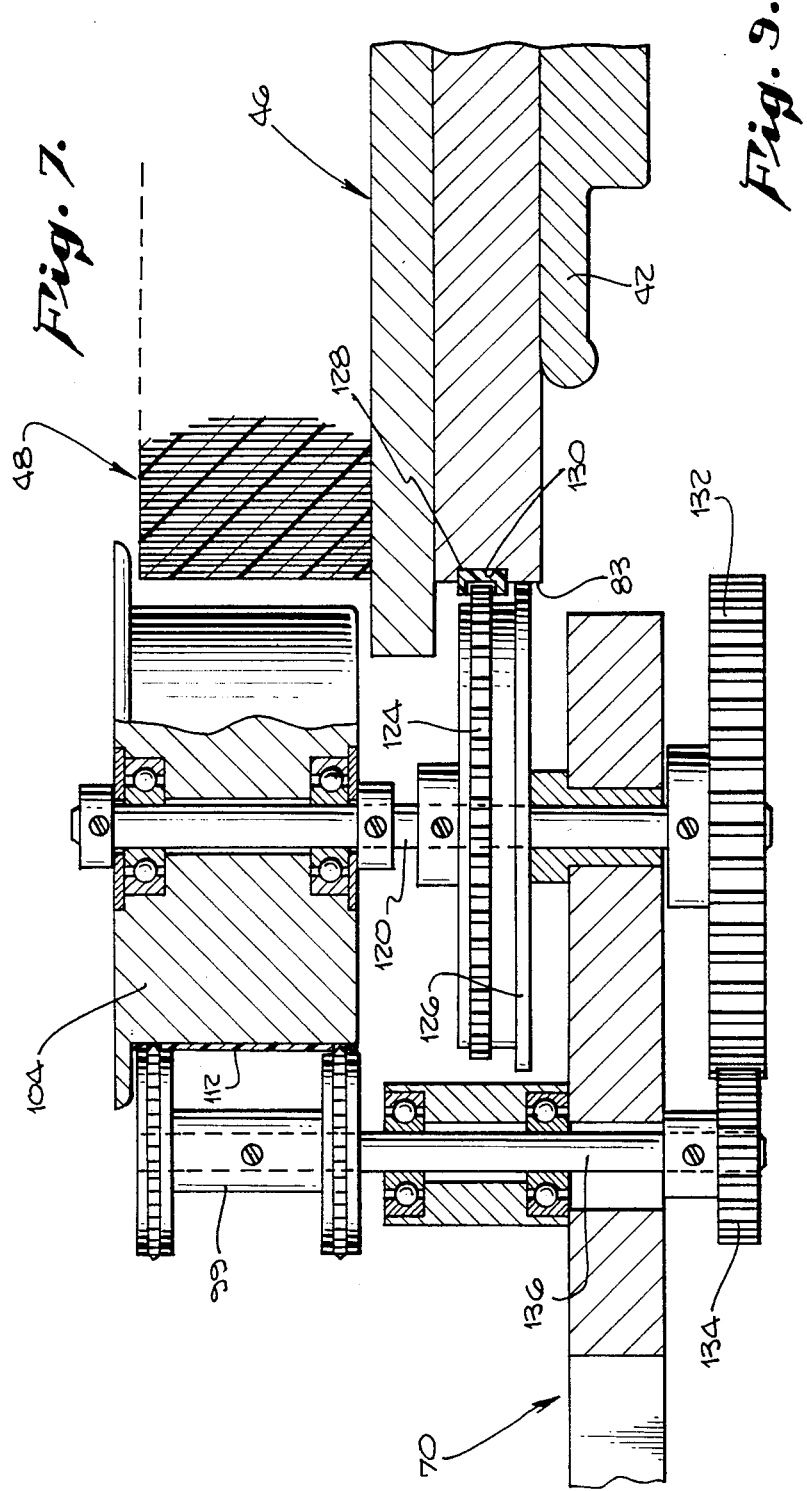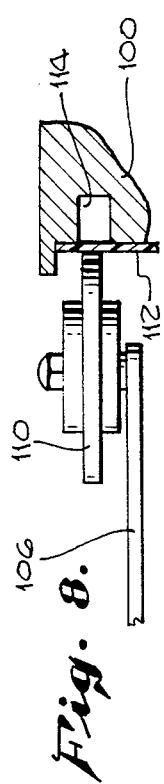

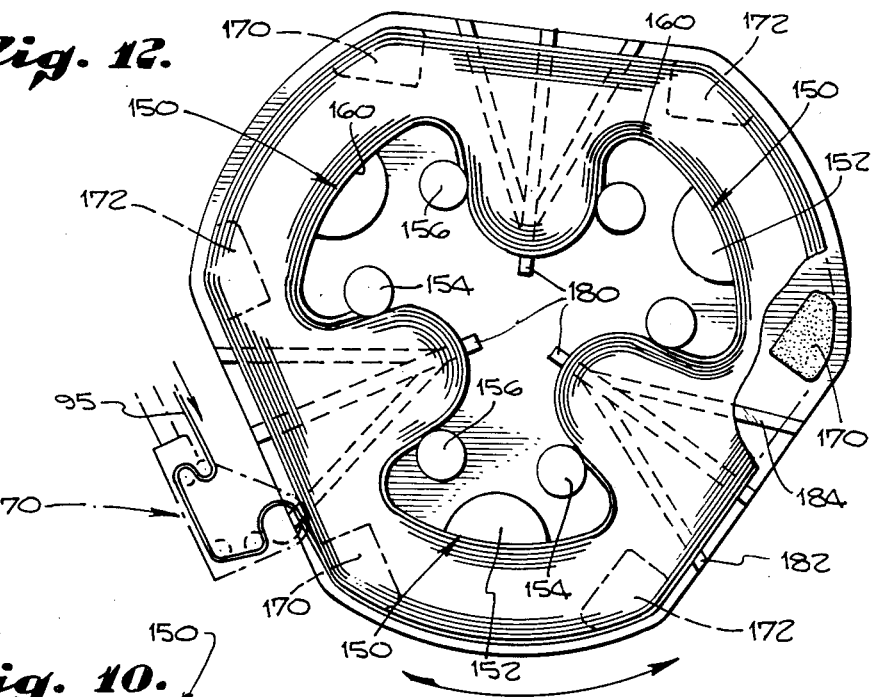
Fig. 12.
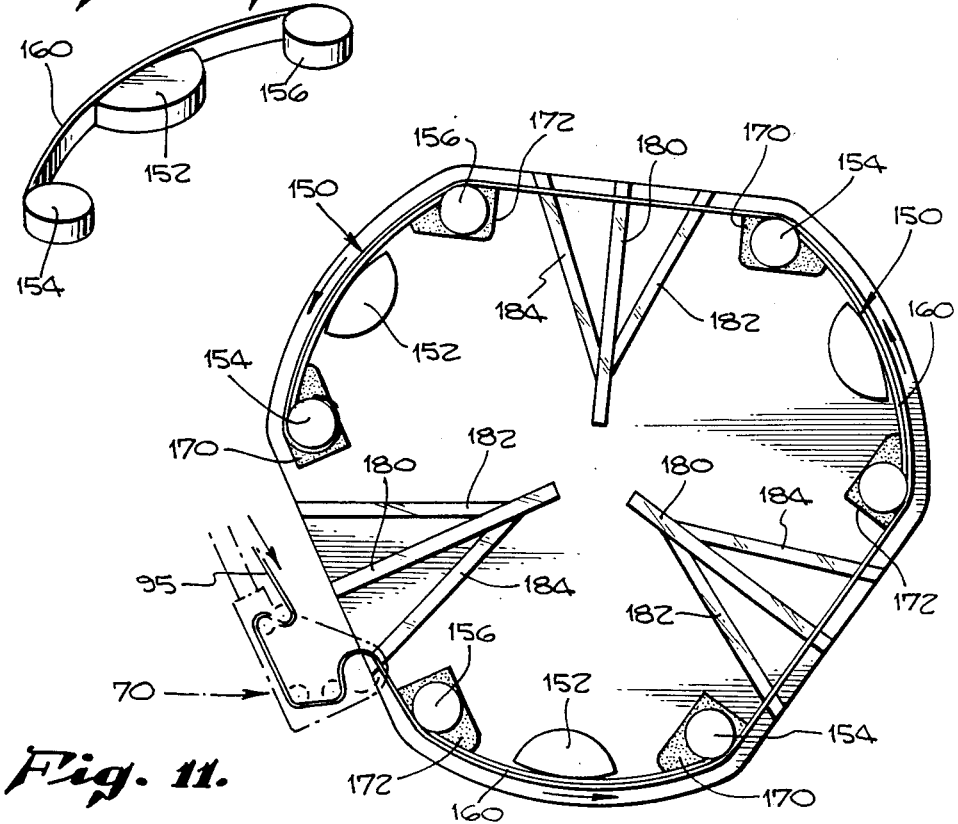
Fig. 10.
Fig. 11.

ENDLESS LOOP TRANSPORT AND STORAGE SYSTEM

This is a continuation of application Ser. No. 777,150, filed Sept. 18, 1985, now abandoned.

BACKGROUND AND SUMMARY OF THE INVENTION

This invention relates generally to a system for storing a quantity of continuous strip material such as tape or film. More particularly, the invention describes a method and apparatus for continuously storing motion picture film on edge on a flat rotating platter, as part of an endless loop projection system.

It has long been recognized in motion picture projection that an endless loop system is desirable, in order to eliminate the need for manual rewinding and rethreading of film in repeated renditions of a program. A number of attempts have been made to provide for storing the film in a coil on a rotating turntable or platter in such a way as to minimize relative longitudinal movement between adjacent film layers in the coil, and yet permit, during each platter revolution, a predetermined length of film to be withdrawn from the center of the coil while the identical length of film is being added to the outside of the coil. The prior systems produce a series of angularly spaced, inwardly directed rounded cusps in the film coil, and are exemplified by the two U.S. Pat. Nos. to Johnson, 4,066,221 and 4,186,891 and the U.S. Pat. No. 4,208,018 to Wilkinson. These patents, in common with other prior systems known to the present inventor, include an application apparatus for incoming film which feeds or applies the incoming film to the rotating platter at a constant linear speed. Separate means are provided in these systems for shaping the film in the coil into a number of spaced inwardly directed cusps.

The present invention distinguishes over the prior systems just mentioned by providing a method and apparatus in which incremental lengths of the incoming film are accurately metered onto the rotating coil at selected sectors of the platter at a varying linear rate per degree of platter rotation whereby an exact equal length of film is applied for every complete revolution of the platter. The method and apparatus of the present invention applies incoming film during one complete turn of the platter at a selected linear rate for a sector of the platter, then at a diminishing linear rate down to a minimum linear rate, then at an increasing linear rate back to the selected linear rate. As will be seen in the application of film to one of the sectors, a constant selected linear rate forms arcuate sections while in the application of film to the portions of varying and lowered linear rates a straight section of film is formed, substantially in the shape of a chord of a circle. An arcuate section and an adjacent straight section are referred to as a "cycle." The straight sections or chords automatically form themselves into cusps as successive film layers are applied in chord shape. In the illustrative form of the invention disclosed herein, the cycle above described is repeated three times during each revolution of the platter. The varying speeds or linear rates of film application are achieved by a specially shaped platter geared cam track formed with arcuate sections alternating with chord sections corresponding in angular relation with respect to the axis of rotation as the arcuate and chord sections formed by the application of film to the platter margin. The film is applied by an application arm having a geared cam follower cooperating with the platter geared cam track.

Formation of the inwardly directed cusps may be facilitated by providing, in the sectors including the chord sections, skid means in the form of skid strips of material having a low coefficient of friction, the strips extending generally radially of the platter within the segments mentioned. The strips may be made, for example, of polytetrafluroethylene (sold under the registered trademark "Teflon") or other material presenting an upper surface of substantially lower friction than the platter itself, to to allow freedom of inward movement of the film as it is being formed into cusps. The shapes of the arcuate portions of the coiled film may desirably be preserved by flat anchor pads of rubber or equivalent material having a comparatively high coefficient of friction. These pads thus serve as anchors to assist in retaining the arcuate portions of the film coil is between the arcuate sections and also to hold the outermost chord sections of the film coil under a taut tensioned condition.

Template means may be provided to assist in maintaining the shape of the arcuate portions of the film coil, during initial loading or make-up of the film coil on the platter. Each template means desirably includes a central template block and a pair of laterally spaced smaller wing blocks, the three blocks being joined by a flexible strip having a width similar to that of the film, to form a template set. The template sets may be left in place during complete loading of the turntable, and then removed when loading is completed and the endless loop is formed.

It is therefore the principal object of the present invention to disclose a novel system for storing film in a coil on a rotating platter. Additional objects are to disclose such a system for use in an endless loop projection system and using a geared camming relationship to accurately control the rate of film application to the coil; to accurately apply and withdraw equal lengths of film to and from the storage platter during each revolution of the storage platter; to disclose method and apparatus for preliminary shaping of the film coil during initial stages of loading or make-up of the film coil; and for other and additional objects as will be understood from a study of the following illustrative form of the invention, taken in connection with the accompanying drawings.

BRIEF DESCRIPTION OF THE DRAWINGS

FIG. 1 is a side elevational view of a conventional film winding machine with the system of the present invention mounted on the uppermost of the three turntables.

FIG. 2 is a top plan view of the major components of an endless loop system embodying the present invention, including the platter and the film application roller assembly and, diagramatically shown, the film path to and from a film projector; on the platter in dotted outline is shown the approximate contour of the innermost layer of the film winding when the platter is substantially fully loaded.

FIG. 3 is a fragmentary plan view on an enlarged scale of the upper portion of the platter as seen in FIG. 2, showing one of the inwardly directed cusps formed in the film winding, the film being shown substantially fully loaded on the platter.

FIG. 4 is a fragmentary view on an enlarged scale of the lower left portion of FIG. 2, showing details of the film application arm and its interengagement with the platter.

FIG. 5 is a fragmentary view on an enlarged scale of the distal portion of the film application arm, showing the path of film immediately before it reaches the application roller, and including an illustrative fail-safe mechanism of the system.

FIG. 6 is a sectional view taken on arrows VI—VI of FIG. 5 showing details of the drive mechanism for the metering sprocket gear.

FIG. 7 is a sectional view on a greatly enlarged scale taken on arrows VII-VII of FIG. 4.

FIG. 8 is a fragmentary view taken on arrows VIII—VIII of FIG. 5 showing details of the fail-safe mechanism in its normal operating condition.

FIG. 9 is a view similar to FIG. 8 except showing the fail-safe mechanism when it has been actuated by a defect or break in the film.

FIG. 10 is a perspective view of a set of template blocks used to assist in shaping successive film layers during the process of loading or make-up in accordance with the present invention.

FIG. 11 is a plan view of the platter of the present system with the first layer of film in place, in condition for the commencement of the loading or make-up process.

FIG. 12 is a plan view similar to FIG. 11 showing the platter as make-up is virtually complete.

DETAILED DESCRIPTION

The present invention will be described first with reference to FIG. 1 showing a film winding machine of generally conventional construction, modified to embody a system of the present invention. Thus the machine includes a rigid support structure indicated generally at 20 including a pair of lower support legs 22, 24 forming a V with the vertex 26 at the left, resting on the floor 28. From the vertex 26 an upright post 30 extends upwardly. Support arms 32 and 34 are fixed to post 30 and project horizontally, each supporting a rotatable turntable 33 and 35 respectively on which a film is stored, on edge, in use.

The parts thus far described are conventional and well known in the art. The apparatus of the present invention, to be now described, may be incorporated into existing non-endless loop film handling systems as a retrofit, or may be utilized in a new endless loop film handling system.

A third support arm 40 extends horizontally above the other arms and carries a rotatable turntable 42. The axis of turntable 42 is spaced farther from post 20 than are the axes of turntables 33 and 35, to provide sufficient film storage capacity when the stored film is shaped with inwardly projecting cusps in accordance with the invention. Attached to the upper side of turntable 42 is a platter indicated generally at 46 on which a quantity of film indicated generally at 48 is supported on its edge. The film path during operation includes an upwardly inclined exiting film portion 49 extending from the center of the platter to a guide roller 50 mounted on the post 30. The complete film path will be described in connection with FIG. 2.

Thus in FIG. 2 exiting film portion 49 passes over guide roller 50, and as diagramatically shown, passes over guide rollers 51 and 52, thence downwardly to a vertically adjustable roller 52A and thence upwardly to guide roller 52B. It will be understood that roller 52A may be selectively adjusted vertically in order to minimize or eliminate slack in the endless loop. From roller 52B the film goes via guide roller 53 to a film projector 54. The film return path from the projector passes over guide rollers 55, 56, 57 and 58, the latter roller being carried at the outer end of a speed control arm 60. The latter arm extends radially beneath the upper turntable to a speed control means 62 which controls the speed of rotation of the upper turntable. As diagramatically indicated at 64, the outer end of speed control arm 60 is biased in a clockwise direction by a spring 61 as seen in FIG. 2, in order to maintain a desired tension on the film entering and exiting the guide roller 58. The speed control means may be one of those presently in use on existing film handling systems.

From guide roller 58 the exiting film moves via guide rollers 66 and 67 to the film metering and application arm indicated generally at 70; the film path there will be described in detail in connection with FIGS. 4 and 5.

With continued reference to FIG. 2, it will be seen that the contour of the periphery of platter 46 include a plurality of arcuate sections alternating with straight sections, there being three of each of the two types of sections in the preferred form of the invention illustrated. Thus arcuate sections 72, 74 and 76 alternate with straight sections 78, 80 and 82. Recessed inwardly from the periphery of the platter, and seen in dotted outline in FIG. 2 is the contour of a geared cam track, geometrically similar to the periphery of the platter, and including arcuate sections 73, 75 and 77, alternating with straight sections 79, 81 and 83. As shown, the periphery of the platter projects beyond the periphery of the cam track, forming an annular projection of substantially uniform equal width immediately inwardly of the platter rim. This annular projection prevents the possibility that, during the winding operation, one or more of the outer layers of film might fall off the edge of the platform. As will be later understood, it is the contour of the periphery of the cam track which is important in the operation of the present invention. This aspect is emphasized in FIG. 3, showing a portion of the platter almost fully loaded with film.

The outermost layer of film 48, as it is being wound onto the platter, is vertically aligned with the cam track. The layers applied earlier to the platter will have been incrementally forced inwardly successively as each new outer layer of film is continuously applied in alignment with the cam track. The earlier applied layers of film are thus shaped into a plurality of inwardly directed rounded cusps, one cusp opposite each of the flats or straight sections of the cam track.

Thus cusp 85 is located radially inward of straight section 81 of the cam track, and similar cusps partially seen at 86 and 87 are located radially inward of the other two straight sections of the cam track. For proper shaping of the cusps, each of the straight sections and the arcuate sections of the cam track subtends an angle of about 60° at the center of the turntable.

With reference to FIG. 4, metering and application roller arm 70 is pivotally mounted at 90 to a bracket 92 fixed to vertical post 30. Resilient means such as spring 93 urge arm 70 counterclockwise toward the platter 46. Incoming film 95 moves past guide rollers 66 and 67, then past guide rollers 96, 97 and 98, film sprocket 99, around fail-safe roller 100, and then past a tensioning roller 102 to the film application roller 104, which applies the film to become the outermost layer of the coil of film 48 on the platter 46. The tensioning roller 102 is carried on an arm 103, which in turn is urged clockwise by a spring 105, with the roller 102 functioning to take up slack in the film during the transitions between the arcuate and straight sections.

Fail-safe means are provided to sense the continuous running of the film and to detect any break in the film, particularly a longitudinal split. As seen in FIGS. 4, 5, 8 and 9, a sensor arm 106 is pivotally mounted at 107 to a microswitch unit 108, and is biased lightly counterclockwise. The distal tip 110 of arm 106 continuously senses the existence of the moving film on roller 100. Operation of the device will be understood by reference to FIGS. 8 and 9. In FIG. 8 the sensor tip 11 lightly contacts film 112 during operation. In FIG. 9 the film 112 is no longer present, as would occur in the event of a film break, and the sensor tip is biased into a groove 114 formed in the roller 100. This movement, in known manner, actuates a microswitch in unit 108, thus stopping the projector and other moving parts of the system. A second microswitch may be symmetrically disposed to sense the film near the other edge of roller 100.

In FIG. 7 are shown details of construction of the film metering and application roller assembly. Near the distal end of pivotal arm 70 is journaled a vertical shaft 120. On its upper portion the film application roller 104 is freely journaled. About midway of its length shaft 1 0 has fixedly mounted thereon a gear 124 and a cam follower disk 126. The disk is in contact with straight section 83 of the platter cam track. Gear 124 is in mesh with a gear belt 128, which is partially recessed in a peripheral groove 130 formed in the platter cam track. The gear belt is continuous around the periphery of the cam track.

The lower end of shaft 120 has fixedly mounted thereon a spur gear 132 whose pitch diameter is equal to the diameter of disk 126, and gear 132 drives a smaller gear 134 fixed on the lower end of a countershaft 136, on the upper end of which is fixedly mounted sprocket 99.

It will thus be seen that during rotation of the platter 46, shaft 120 and countershaft 136, and thus film sprocket 99 are all moved at speeds exactly proportional to and synchronized with the linear rate per degree of rotation of the geared cam track. If the platter rotation speed remains essentially constant, as is typical, the speed of rotation of the two shafts and the film sprocket 99 will increase slightly while the arcuate sections of the cam track are in contact with cam follower disk 126, and decrease slightly while the disk is in contact with the straight sections of the cam track, and equal lengths of film are accurately applied onto the platter during each revolution.

In operation, it is preferred to have the roller 104 spaced from the outermost layer of the film 48, as seen in FIG. 7, for the major portion of the operating cycle. Normally the roller contacts the film coil only at the beginning and end portions of each arcuate section during the transition between the straight section to the arcuate section.

FIG. 6 shows the relationship and functioning of sprocket 99, fail-safe roller 100, and their associated parts. A film retainer pad or keeper 138 is carried on an arm 140, with the pad serving to urge the film against the sprocket 99. The arm 140 is slidable between the solid line position with the pad engaging the film, and the phantom line position with clearance between the pad and sprocket for insertion or removal of film. In an alternate configuration, the arm may be pivoted rather than sliding.

FIGS. 10 and 11 show the use of template means to assist in the original loading or make-up of a filmed program which is to become part of an endless loop in accordance with the invention. FIG. 10 shows the template means proper, indicated generally at 150 and including a central template block 152 and a pair of laterally spaced blocks or wings 154, 156, the three blocks being joined together to form a set by a strip 160 attached to the blocks. The width of the strip and the height of the template blocks is generally similar to the width of the film being stored. The strip is stiff enough to assume and initially retain its original position seen in FIG. 10, with the strip 160 in an arcuate shape, as seen in FIG. 11, substantially congruent with a portion of the outer circumference of the coil of film to be stored.

As appears in FIG. 11, one template set 150 is provided for each of the three arcuate sections of the coil being formed. At the beginning of loading or make-up the leading end of the film may be attached to one of the template blocks.

In order to maintain the shape of the arcuate and straight sections at the outer periphery of the coil, it is desirable to provide on the surface of the platter an anchor pad located beneath the initial position of each of the laterally spaced wing blocks of the template means. The anchor pads are indicated at 170 and 172, and are made of a material such as a rubbery substance having a high coefficient of friction, so that the anchor pads assist the wing blocks to resist breakdown or inward movement of the ends of the arcuate film sections until a sufficient number of layers of film at the peripheral margin of the platter have been applied to the coil to give the coil stability. As stability is attained the flexibility of the template strip 160 permits it to bend, and thus to allow the template wing blocks 154, 156 to move radially inwardly toward their final positions seen in FIG. 12. During operation, the anchor pads on the surface of the platter engage the outermost portions of the film coil to maintain stability of the coil and to resist inward movement of coil portions in contact therewith. With loading thus completed, the leading end of the film is detached from the template block, all template sets are removed, and the leading end of the film is threaded through the film path previously described, to be spliced to the tail end of the film program to form the endless loop. Rendition of the program can then be repeated as many times as desired without further attention by the operator.

As mentioned hereinabove, the anchor pads of friction material on alternate sectors of the platter serve during operation to assist in maintaining the shapes of the arcuate sections and particularly assist in providing tension or taughtness of the straight sections which are the chord sections extending between adjacent arcuate sections during application of the film to the platter.

As best seen in FIG. 11, one or more elongated skid strips may be provided on the upper surface of the platter to assist the portions of film forming the cusps to move smoothly toward the center of the platter during operation. Thus, with continued reference to FIG. 11, extending radially upwardly from the center of each of the chord portions or straight sections of the platter is a strip 180, by preference made of teflon or similar material of low friction. As will be understood, this provides a skid surface for the lower edge of the film as each layer moves inwardly during operation. Additional flanking strips 182 and 184 may be provided to increase the assistance given to the film layers in their inward movement.

What is claimed is:

1. A method for continuously storing a strip of material on edge in a coil on a flat platter rotating at a selected speed about an axis, comprising the step of:

during each cycle of revolution of the platter, continuously applying an incoming strip of material at the peripheral margin of the platter at a varying rate per degree of rotation and along a selected path having alternating sections of greater distance from the axis and lesser distance from the axis, the sections being substantially equal sectors of the platter.

2. The method as claimed in claim 1 wherein varying the rate of applying the strip of material during each cycle of revolution includes the further steps of:

maintaining the rate of application of said strip substantially constant along the sections of greater distance; and decreasing and then increasing the rate of application of the strip along sections of lesser distance.

3. The method as claimed in claim 1 including the steps of:

providing a second path having a similar configuration as said first path and in similar angular relation to and distance from the platter axis as said first path;

and precisely metering the application of the strip along said first path by reference to the position of the second path with respect to the first path.

4. The method as claimed in claim 1 including the step of:

withdrawing a selected length of the strip from the center of the coil while adding an identical length of strip material to the peripheral margin of the platter during one revolution of the platter.

5. A method for continuously storing a strip of material on edge in the form of a coil on a flat surface of a platter rotating about an axis, including the steps of:

providing a selected first path for receiving and advancing the strip of material on said flat surface of said platter adjacent the periphery thereof;

providing a selected second path corresponding in configuration to said first selected path;

rotating both paths about said axis;

continuously applying the incoming strip material for each revolution of said platter at the peripheral margin of the platter at a varying rate per degree of rotation onto said first path and in accordance with said second path, an equal length of strip material being applied to said first path for each revolution of both paths about said axis.

6. A method as claimed in claim 5, including the step of:

providing both of the said paths with alternating arcuate and straight sections encompassing equal sectors of said platter.

7. In an apparatus for continuously storing a strip of material in a coil, including a flat platter and drive means for rotating said platter, the improvement comprising in combination:

a cam mounted for rotation with said platter about its center, said cam having a cam track with alternating sections of greater distance from said center and lesser distance from said center; and means for applying the incoming strip to the periphery of said coil of the strip on said platter as said platter rotates, said means for applying including a cam follower for engaging said cam track and varying the distance from said center to the point of application of the strip;

said cam follower including a first gear and said cam track including a second gear, with said first and second gears engaging each other for driving said first gear as a function of rotation of said cam and platter.

8. An apparatus as claimed in claim 7 including a sprocket for advancing the strip at a controlled rate; and means for coupling said first gear with said sprocket for driving said sprocket to cyclically increase and decrease the rate at which the incoming strip is applied to said coil.

9. In an apparatus for continuously storing a strip of material in a coil, including a flat platter and drive means for rotating said platter, the improvement comprising in combination:

a cam mounted for rotation with said platter about its center, said cam having a cam track with alternating sections of greater distance from said center and lesser distance from said center;

means for applying the incoming strip to the periphery of said coil of the strip on said platter and said platter rotates, said means for applying including a cam follower for engaging said cam track and varying the distance from said center to the point of application of the strip; and at least one template block having a central section with opposite ends, said template block being adapted for positioning on said platter and said central section being of a resilient material so that said opposite ends may be forced toward each other by the compressive action of cusps formed in said coil.

10. In an apparatus for continuously storing a strip of material in a coil, including a flat platter and drive means for rotating said platter, the improvement comprising in combination:

a cam mounted for rotation with said platter about its center, said cam having a cam track with alternating sections of greater distance from said center and lesser distance from said center;

means for applying the incoming strip to the periphery of said coil of the strip on said platter as said platter rotates, said means for applying including a cam follower for engaging said cam track and varying the distance from said center to the point of application of the strip; and template blocks, each having a central section with opposite ends, each of said template blocks being adapted for positioning on said platter with said central section of a resilient material so that said opposite ends may be forced toward each other by the compressive action of cusps formed in said film coil.

11. In an apparatus for continuously storing a strip of material in a coil including a flat platter having a center axis and drive means for rotating said platter, the coil lying edgewise on the platter and the strip including an incoming strip portion leading to the coil periphery and an outgoing strip portion departing from the coil center, the improvement comprising in combination:

means for rotating said platter at a selected speed of rotation;

a geared cam mounted for rotation with said platter about said axis, said cam having a geared cam track with alternating section of greater distance from said center axis and lesser distance from said center axis;

a sprocket for advancing the incoming strip portion at a controlled rate; and means for accurately applying the incoming strip portion to the periphery of said coil of the strip on said platter as said platter rotates;

said means for applying said strip portion including a geared cam follower means for engaging said geared cam track and moving there-along at a controlled linear rate per degree of rotation and for varying the distance from said center axis to the point of application of the incoming strip portion;

said cam follower means including means for driving said sprocket in synchronism with said controlled linear rate of the cam follower means along said cam track.

12. An apparatus as defined in claim 11, wherein said geared cam track has at least three arcuate sections alternating with straight sections.

13. An apparatus as defined in claim 11 wherein the periphery of said coil includes a plurality of angularly spaced arcuate sections, each of said arcuate sections corresponding to one of said sections of the cam track of greater distance from said center.

14. An apparatus as defined in claim 13, including a plurality of friction anchor pads fixed to the upper surface of the platter distant from said center axis, said pads being disposed beneath said arcuate sections of the coil for contact therewith, the upper surface of said anchor pads having a higher coefficient of friction than that of the upper surface of the platter.

15. An apparatus as defined in claim 14 wherein the upper surface of said platter in the sectors between the sectors defined by said arcuate sections, is provided with skid means having an upper surface with a lower coefficient of friction than that of the upper surface of the platter in the sectors which include said arcuate sections and said anchor pads.

16. In an apparatus for continuously storing a strip of material in a coil having a center including a flat platter and drive means for rotating said platter, the coil lying edgewise on the platter and the strip including an incoming strip portion leading to the platter peripheral edge margin and an outgoing strip portion departing from the coil center, the improvement comprising in combination:

a cam means mounted for rotation with said platter about its center, said cam means having a cam track adjacent said peripheral edge margin with alternating sections of greater distance from said center and lesser distance from said center;

metering means for advancing the incoming strip portion at a controlled rate; and means for applying the incoming strip portion to the peripheral edge margin of said platter as said platter rotates, said means for applying including a cam follower means for engaging said cam track and for moving there-along at a controlled linear rate per degree of platter rotation and for varying the distance from said center to the point of application of the incoming strip portion;

said cam follower means including means for driving said metering means in synchronism with said controlled linear speed of the cam follower means along said cam track.

17. An apparatus as defined in claim 16 wherein said cam follower means includes
a first gear, and
said cam track includes a geared track, said first gear engaging said geared track for driving said first gear as a function of rotation of said cam means and platter.

18. In an apparatus for continuously storing a strip of material in a coil including a flat platter having an axis and drive means for rotating said platter about said axis, the coil lying edgewise on the platter and the strip including an incoming strip portion leading to the coil periphery and an outgoing strip portion leading from the coil center, the improvement comprising in combination:

means for rotating said platter about said axis;

a cam means mounted for coaxial rotation with said platter, said cam means having a cam gear member with alternating sections at greater distance from said axis and at lesser distance from said axis;

metering means for accurately advancing the incoming strip portion at a controlled rate per degree of rotation; and means for precisely applying the incoming strip portion to the periphery of said coil on said platter as said platter rotates;

said means for applying said strip including a cam follower gear for engaging said cam gear member and moving therealong at a controlled linear rate per degree of rotation and for varying the distance from said center to the point of application of the incoming strip portion;

said cam follower gear including means for accurately driving said metering means in synchronism with said controlled linear rate per degree of rotation of the cam follower gear along said cam gear member.

19. In an apparatus for continuously storing a strip of material in a coil including a platter and drive means for rotating the platter about an axis, comprising in combination:

means including a cam follower gear and a cam gear belt for applying and metering an incremental length of film strip for each angular degree of rotation of the platter along a path having a first path section of substantially uniform distance from the axis of rotation and a second path section alternating therewith of varying distance from the axis of the platter;

means including friction means on the surface of the platter at the portion of the path where the first and second path sections meet to provide resistance to radial inward movement of the strip for tensioning the strip in the second section;

means including anti-friction means on the surface of the platter in the portion of the path of the second section;

whereby application of an outermost strip of the film strip coil being formed forces the previously applied strip incrementally inwardly at the first path section and, at the second path section, moves the previously applied strip inwardly to form cusps toward the axis of the platter having progressively increasing concavity.

20. A method for continuously storing a strip of material on edge in a coil on a flat platter rotating at a selected speed about an axis, comprising the step of:
  continuously applying an incoming strip of material at the peripheral margin of the platter at a varying rate per degree of rotation and along a selected path having alternating sections of greater distance from the axis and lesser distance from the axis, the sections being substantially equal sectors of the platter; and
  frictionally resisting radial inward movement of the strip material at sections of greater distance of said selected path.

21. A method for continuously storing a strip of material on edge in a coil on a flat platter rotating at a selected speed about an axis, comprising the step of:
  continuously applying an incoming strip of material at the peripheral margin of the platter at a varying rate per degree of rotation and along a selected path having alternating sections of greater distance from the axis and lesser distance from the axis, the sections being substantially equal sectors of the platter; and
  anti-frictionally assisting radial inward movement of sections of lesser distance of said strip material in said selected path to form inward concave cusps between said arcuate sections.

22. A method for continuously storing a strip of material on edge in the form of a coil on a flat surface of a platter rotating about an axis, including the steps of:
  providing a selected first path for receiving and advnacing the strip of material on said flat surface of said platter adjacent the periphery thereof;
  providing a selected second path corresponding in configuration to said first selected path;
  rotating both paths about said axis;
  metering strip material onto said first path in accordance with said second path, an equal length of strip material being applied to said first path for each revolution of both paths about said axis;
  providing both of said paths with alternating arcuate and straight sections;
  frictionally resisting radial inward movement of applied strips of material at arcuate sections of said first path; and
  assisting radial inward movement of said straight sections of said first path whereby radially inwardly directed cusps of strip material are formed from said initially straight sections of said strips of material.

* * * * *